3,497,466
ADHESIVE CONCENTRATE FOR IMPROVING ADHESION OF COATING COMPOSITIONS TO BASE COATED METAL SUBSTRATES, AND CANS OR CAN COMPONENTS COATED THEREWITH
Michael H. Markulin, Pittsburgh, Pa., and Julio H. Basto, Hopatcong, N.J., assignors to Technical Coatings Co., New York, N.Y., a corporation of Pennsylvania
No Drawing. Filed Dec. 15, 1967, Ser. No. 690,749
Int. Cl. C08f 41/10, 41/12; C09d 3/76
U.S. Cl. 260—21
16 Claims

ABSTRACT OF THE DISCLOSURE

A vinyl resin top coat for strong adhesion to any of the base coated metal substrates used for cans for beer and other carbonated or non-carbonated beverages contains at least approximately 4.6%, by weight, of an adhesive concentrate having as its essential constituents, an aminoplast, such as, polymethyl ethers of polymethylol melamine, butylated urea- or melamine-formaldehydes and triazine-formaldehyde, a vinyl containing a reactive hydrogen group, such as, hydrolyzed vinyl chloride-vinyl acetate copolmer and vinyl chloride-vinyl acetate-maleic acid interpolymer, and an oil, such as, tung oil, linseed oil, soybean oil and the like, with the balance of the top coat being preferably constituted by unmodified or non-reactive vinyl chloride-vinyl acetate copolymer.

---

This invention relates generally to sanitary coating compositions particularly intended for the interior coating of cans and other metal containers and parts thereof for foods, beer and other carbonated and non-carbonated beverages.

Cans and similar metal containers and parts thereof for foods and beverages, whether formed of tin plate, tin-free steel or aluminum, all require interior sanitary coatings to avoid influencing of the flavor, contamination or deterioration of the contained food or beverage by the metal. In providing such sanitary coatings, at least two coats are usually applied to ensure complete coverage. If both coats are applied to the metal in sheet or web form, so as to be applicable by rollers for minimum loss by scattering, then the coating inevitably has scratches or other interruptions made therein during the handling of the coated metal and the forming thereof into cans or other containers. On the other hand, if both coats are applied to the finished cans, as by spraying, there is a relatively large, uneconomic loss of the coating material by scattering thereof. Accordingly, it has become the usual practice to effect the roller application of a base coat to the metal while in sheet or web form for minimum loss of the coating material, and to apply a top coat to the finished can or container, as by spraying, to ensure complete coverage, particularly at the locations where the base coat may have been scratched or interrupted during forming of the can.

The material selected for the base coat must adhere tenaciously to the underlying metal and have adequate flexibility to avoid fracture or cracking when the base coated metal is bent or formed during the various operations of producing a can therefrom. Suitable base coats are formed of highly cross-linked thermosetting materials, such as, phenolics, epoxy phenolics, epoxy urea formaldehyde, polybutadienes, oleoresinous lacquers, epox phenolic acrylic combinations, and eopxy esters.

Since the material of the top coat is applied to the finished can having printed or other decoration thereon, the top coat must have a relatively low bake temperature to avoid deleterious effects on the decoration during baking of the top coat. Further, the top coat, after baking, must be resistant to the water and/or alcohol of the contained food or beverage and to the steam sterilization and product pasteurization procedures conventionally employed, and also free of harmful, toxic or flavor influencing constituents.

Various vinyl resin solutions have been used for top coats that more or less fulfill the above requirements, that is, are relatively free of toxic and odor and taste influencing constituents. However, it is further essential that the top coat adhere tenaciously to the underlying base-coated metal. At present, this most important property is usually imparted to top coats from vinyl resin solutions through the use therein of hydrolyzed or carboxylated interpolymers of a vinyl chloride-vinyl acetate copolymer. Other modifications are used in the art to promote adhesion of vinyl solution top coats to the base coats. However, each of the prior formulations of vinyl resin solutions for use in forming top coats produces resulting top coats or vinyl films that are intended to, and do adhere well only to a particular class or limited number of base coats. Thus, different vinyl resin solutions are provided for producing top coats over the various types of base coats that are in common use.

Accordingly, it is an object of this invention to provide vinyl resin coatings that will adhere tenaciously to a broad range of underlying resinous coatings and thus can be used as the top coat over any of the base coats commonly employed in producing sanitary coatings on cans and other metal containers and parts thereof for foods and beverages.

Another object is to provide top coats that adhere tenaciously to any of the commonly used base coats and that are composed, for the most part, of a vinyl chloride-vinyl acetate copolymer so as to be relatively economical.

Another object is to provide top coats having improved resistance to water and alcohol, and thereby affording increased protection when used in containers for beer and other carbonated and non-carbonated beverages.

Still another object is to provide tightly knitted sanitary coatings which afford the added protection against iron pick-up required when the usual tin plate is replaced by tin-free steel in the manufacture of containers for beer and other carbonated and non-carbonated beverages.

A further object is to provide a mixture of substances, hereinafter referred to as an adhesive concentrate, which, when introduced in relatively small proportions in a vinyl chloride-vinyl acetate copolymer coating solution, makes it possible to achieve from such coating solution a top coat that adheres tenaciously to all commonly used base coats, is strongly resistant to water and alcohol and prevents iron pick-up even when the base-coated metal is a tin-free steel, has a relatively low bake temperature and is also free of harmful, toxic or odor or flavor influencing constituents.

According to this invention, an adhesive concentrate for imparting the above characteristics to a top coat composed for the most part of vinyl chloride-vinyl acetate copolymer has, as its essential ingredients, an aminoplast, a vinyl containing a reactive hydrogen group and an oil. An inorganic or organic acid catalyst may also be included in the adhesive concentrate to increase the reactivity of the aminoplast and thereby accelerate the reaction of the aminoplast with the reactive vinyl for decreasing the required baking time.

Although the adhesive concentrate may be dissolved alone in suitable solvents and the resulting solution applied to any commonly base coated metal substrate to provide a top coat having the desired properties mentioned above, the constituents of the adhesive concentrate are relatively more costly than non-reactive vinyl resins, such as, vinyl chloride-vinyl acetate copolymer, and, therefore, it is desirable for economic reasons that the coating solution contain a relatively large proportion of such inexpensive non-reactive vinyl resin in addition to a relatively small proportion of the adhesive concentrate. In fact, it has been found that the mentioned advantages of this invention are attained when the weight of adhesive concentrate, that is, the combined weight of aminoplast, reactive vinyl resin and oil, is as little as approximately 4.5% of the total weight of adhesive concentrate and non-reactive vinyl resin in the coating solution. For the economic reasons noted above, the weight of adhesive concentrate is preferably no greater than approximately 20% of the total weight of adhesive concentrate and non-reactive vinyl resin in the coating solution.

Within the adhesive concentrate itself, substantial variations are permissable in the proportions of the recited essential ingredients. Thus, the weight of aminoplast may vary between about 11% and 25% of the combined weight of aminoplast, reactive vinyl resin and oil, the weight of reactive vinyl resin may vary between about 65% and 87.5% of said combined weight, and the weight of oil may vary between about 2% and 10% of said combined weight.

Among the aminoplast resins that can be employed in the adhesive concentrate are those resinous materials which are the reaction product of an aldehyde, such as, formaldehyde, with an amino compound, such as urea, thiourea, dicyandiamide, or the aminotriazines, for example, melamine, benzoguanamine, acetoguanamine, formoguanamine and the like, in mol ratios that are well known in the art and depend on the particular amino compound selected. These amino-aldehydic resins, or potentially resin forming materials, may be alkylated or unalkylated. The alkylated aminoplast resins are those which have been reacted with a monohydric aliphatic alcohol, such as, methanol, ethanol, propanol, butanol and the like, and the degree of alkylation may be substantially varied.

Among specific aminoplast resins that may be employed are the butylated urea-formaldehydes available commercially under the trade names Uformite 24ON and Beckamin P–196; the butylated melamine-formaldehydes available commercially under the trade names Resimeme 879 and Cymel 243-3, 248-8 and 255-10; and the triazine-formaldehyde available commercially under the tradename Uformite MX–61.

Particularly suited for use as the aminoplast resins of the adhesive concentrate are the polymethyl ethers of polymethylol melamine, such as, tetramethyl ether of tetramethylol melamine, with the hexamethylol ether of hexamethylol melamine, for example, as is commercially available under the tradename Cymel 301, being preferred. Of course, the various aminoplast resins mentioned herein may be used singly or in combination with each other.

The reactive vinyl resin of the adhesive concentrate must have reactive hydrogen groups on its molecule which can react with the aminoplast resin for increasing the molecular weight and, if sufficient aminoplast resin is present serve to crosslink the molecule. If the reactive hydrogen atoms are parts of polar groups, these groups will increase the adhesion of the resulting top coat to the base coat. It has been found that the best types of reactive vinyl resins for use in the adhesive concentrate are those containing vinyl chloride-vinyl acetate and a polar group having a reactive hydrogen, as the vinyl chloride-vinyl acetate polymers do not impart undesirable odor or taste to the foods or beverages in the coated cans or containers.

Preferred for use as the reactive vinyl resin of the adhesive concentrate are hydrolyzed vinyl chloride-vinyl acetate copolymer and the terpolymer of vinyl chloride-vinyl acetate-maleic acid, used either singly or in combination with each other.

Hydrolyzed vinyl chloride-vinyl acetate copolymer contains hydroxyl groups on the molecule. Such hydroxyl groups are points of reactivity on the molecule and may cause cross-linking as well as improving adhesion to base coats. The hydroxyl content depends on the amount of vinyl acetate present in the copolymer and on how much of such vinyl acetate has been hydrolyzed. It is preferred to use a partially hydrolyzed vinyl chloride-vinyl acetate copolymer prepared from a vinyl chloride-vinyl acetate containing approximately 86% vinyl chloride and 14% vinyl acetate and which has been hydrolyed to contain approximately 6% vinyl alcohol, 3% vinyl acetate and 91% vinyl chloride, for example, as in the product which is commercially available under the tradename Vinylite VAGH.

The terpolymer of vinyl chloride-vinyl acetate-maleic acid preferred for use in accordance with this invention has the maleic acid interpolymerized with the vinyl chloride-vinyl acetate to provide carboxyl groups along the molecule constituting reactive sites for cross-linking and improving adhesion to base coats. A particularly preferred terpolymer of this type contains approximately 86% vinyl chloride, 13% vinyl acetate and 1% maleic acid, for example, as in the product available commercially under the tradename Vinylite VMCH.

The oil included in the adhesive concentrate may be one or more of the known drying, semi-drying or essentially non-drying types of occurring oils, among which may be mentioned tung oil, linseed oil, soybean oil, safflower oil, castor oil, olive oil and the like. In addition to the above named oils, use may be made of the fatty acids derived therefrom, as well as of the tall oil fatty acids, to form esters with polyols. Modified oils may also be used, such as the long oil alkyds known in the art, as well as synthetic oils, such as those produced from butadiene or from butadiene and another vinyl monomer, for example, styrene. The oil is an essential constituent of the adhesive concentrate as, in the absence thereof, the desired tenacious adhesion of the vinyl resin top coat to oleo-resinous or polybutadiene base coats will not be attained.

As previously mentioned, a catalyst is not essential to obtain strong or tenacious bonding of a vinyl film containing the adhesive concentrate to the base coats, but the inclusion of a catalyst in the coating solution is preferred for reducing the baking time and thereby permitting accelerated production. Strong organic or inorganic acids are normally used to increase the reactivity of the aminoplast resin, but a carboxylic acid group can be used for that purpose if it is sufficiently acidic. A preferred catalyst is phosphoric acid—85% (food grade), but paratoluene-sulfonic acid and citric acid are also mentioned as specific acids that can be used to advantage. Only trace amounts of phosphoric acid are used as a catalyst in coating solutions containing adhesive concentrates according to this invention. For example, the weight of phosphoric acid employed may be from approximately 0.2% to 0.5% of the weight of aminoplast resin included in the adhesive concentrate.

When the adhesive concentrate is to be added to a vinyl chloride-vinyl acetate copolymer solution to constitute the coating solution, it is not necessary that the constituents of the adhesive concentrate be first dissolved in solvents. Thus, the aminoplast, the reactive vinyl resin and the oil, as well as the acid catalyst if used, can be added directly to the vinyl chloride-vinyl acetate copolymer solution. However, before using the resulting coating solution, the solid reactive vinyl resin of the adhesive concentrate must be completely dissolved therein. To avoid any difficulties in effecting such dissolution, the constituents of the adhesive concentrate are preferably dissolved in a suitable solvent system before adding the resulting adhesive concentrate solution to the solution of vinyl chloride-vinyl acetate copolymer.

The solvent system employed should include one or more oxygen containing polar solvents, such as ketones, esters, chlorinated hydrocarbons and nitroparaffins, among which may be mentioned methyl ethyl ketone, methyl isobutyl ketone, isophorone, cyclohexanone, acetone, 4-methoxy-4-methyl-pentanone-2, ethyleneglycol monobutyl ether, diethyleneglycol monomethyl ether, mono- or diethyleneglycol monomethyl ether acetate, and 2-nitropropane. In order to decrease the cost of the solvent system, a substantial part thereof can be constituted of aromatic hydrocarbon liquids having boiling points in the range between 228° F. and 450° F., such as, xylene, toluene and the solvent available commercially under the tradename Solvesso 100. If the adhesive concentrate solution is to be stored for any substantial period, the solvent system should also contain alcohol, preferably n-butyl alcohol, to stabilize the viscosity of the solution and to prevent premature reaction between the aminoplast and the reactive vinyl resin.

A preferred solvent system for dissolving the adhesive concentrate contains from 15% to 98% of methyl ethyl ketone or methyl isobutyl ketone, from 1% to 50% of toluene and from 1% to 35% of n-butyl alcohol, based on the total weight of the solvent system.

The vinyl chloride-vinyl acetate copolymer preferably included in the coating solution as the non-reactive vinyl resin thereof may consist of 85 to 87% vinyl chloride and 13 to 15% vinyl acetate, for example, as in the products available commercially under the tradename Geon 440X30 and Vinylite VYDS in each of which there is approximately 86% vinyl chloride and 14% vinyl acetate. As previously mentioned, the amounts of the non-reactive vinyl chloride-vinyl acetate copolymer and of the adhesive concentrate are selected so that the latter constitutes from about 4.5% to 20% of their combined weight. In the coating solution, the combined weight of the adhesive concentrate and the vinyl chloride-vinyl acetate copolymer may desirably constitute approximately 25% of the total weight of the solution, but such ratio is not essential and can be varied between about 15% and 27% to ensure that the viscosity of the coating solution is suitable for the procedure, such as, roller coating, spraying, knifing or the like, to be used for applying the coating solution to the base coated metal. In general, coating solution viscosities between about 15 and 75 seconds with a No. 4 Ford cup at 20° C. are suitable for application to base coated cans or can stock.

In addition to the adhesive concentrate solution, the non-reactive vinyl chloride-vinyl acetate copolymer and solvents for the latter, the coating solution may desirably contain small amounts, such as, from 0.1% to 0.5% of the weight of the total solution, of a thermal stabilizer selected from 1,2 epoxy compounds, of which propylene oxide is preferred. Other thermal stabilizers that can be used include phenoxypropylene oxide, epichlorhydrin, ethylene oxide, diallyl ether monoxide, and phenyl glycidyl ether.

In preparing the adhesive concentrate solution, it is preferred to slowly add the reactive vinyl resin to the solvent system (for example, of methyl isobutyl ketone, toluene and n-butyl alcohol) while agitating the solvent system. After the reactive vinyl resin has dissolved, which dissolution may be hastened by moderate heating, for example, to a temperature of about 125° F., the aminoplast, oil and acid catalyst are added with mixing. The resulting adhesive concentrate solution may advantageously contain approximately 25% by weight of the aminoplast, reactive vinyl resin and oil based on the total weight of such solution. The adhesive concentrate solution thus formed is preferably mixed into a solution of the vinyl chloride-vinyl acetate copolymer in a suitable solvent system preferably formed of solvents selected from among those mentioned above with respect to the solvent system for the adhesive concentrate solution.

The following specific examples are merely illustrative of particular adhesive concentrate solutions and corresponding coating solutions in accordance with this invention. In all of such examples, the proportions given are by weight, and the previously detailed procedures have been followed in forming the several solutions.

EXAMPLE I (A) Adhesive concentrate solution

| | Percent |
|---|---|
| Vinyl chloride-vinyl acetate-maleic acid interpolymer (Vinylite VMCH) | 8.17 |
| Hydrolyzed vinyl chloride-vinyl acetate copolymer (Vinylite VAGH) | 8.17 |
| Hexamethylol ether of hexamethylol melamine (Cymel 301) | 6.25 |
| Tung oil | 2.50 |
| n-Butyl alcohol | 14.38 |
| Methyl-isobutyl-ketone | 32.77 |
| Toluene | 27.846 |
| Phosphoric acid 85% (food grade) | 0.014 |

(B) Coating solution

| | Percent |
|---|---|
| Vinyl chloride-vinyl acetate copolymer (Geon 440X30) | 20.00 |
| Toluene | 30.45 |
| Methyl ethyl ketone | 14.11 |
| Xylene | 11.48 |
| 4-methyl-4-methyl-pentanone-2 | 1.09 |
| Dimethyl formamide | 1.09 |
| Acetone | 1.42 |
| Propylene oxide | 0.36 |
| Adhesive concentrate solution IA | 20.00 |

EXAMPLE II (A) Adhesive concentrate solution

| | Percent |
|---|---|
| Vinyl chloride-vinyl acetate-maleic acid interpolymer (Vinylite VMCH) | 10.90 |
| Hydrolyzed vinyl chloride-vinyl acetate copolymer (Vinylite VAGH) | 10.90 |
| Hexamethylol ether of hexamethylol melamine (Cymel 301) | 2.71 |
| Tung oil | 0.54 |
| n-Butyl alcohol | 14.38 |
| Methyl ethyl ketone | 32.72 |
| Toluene | 27.836 |
| Phosphoric acid 85% (food grade) | 0.014 |

(B) Coating solution

| | Percent |
|---|---|
| Vinyl chloride-vinyl acetate copolymer (Geon 440X30) | 23.85 |
| Toluene | 42.00 |
| Methyl ethyl ketone | 14.11 |
| Xylene | 11.48 |
| 4-methyl-4-methyl-pentanone-2 | 1.09 |
| Dimethyl formamide | 1.09 |
| Acetone | 1.42 |
| Propylene oxide | 0.36 |
| Adhesive concentrate solution IIA | 4.60 |

EXAMPLE III (A) Adhesive concentrate solution

| | Percent |
|---|---|
| Hydrolyzed vinyl chloride-vinyl acetate copolymer (Vinylite VAGH) | 16.25 |
| Hexamethylol ether of hexamethylol melamine (Cymel 301) | 6.25 |
| Tung oil | 2.50 |
| n-Butyl alcohol | 14.38 |
| Methyl-isobutyl ketone | 32.77 |
| Toluene | 27.836 |
| Phosphoric acid 85% (food grade) | 0.014 |

(B) Coating solution

| | Percent |
|---|---|
| Vinyl chloride-vinyl acetate copolymer (Vinylite VYDS) | 20.00 |
| Toluene | 30.45 |
| Methyl ethyl ketone | 14.11 |
| Xylene | 11.48 |
| 4-methyl-4-methyl-pentanone-2 | 1.09 |
| Dimethyl formamide | 1.09 |
| Acetone | 1.42 |
| Propylene oxide | 0.36 |
| Adhesive concentrate solution IIIA | 20.00 |

EXAMPLE IV (A) Adhesive concentrate solution

| | Percent |
|---|---|
| Hydrolyzed vinyl chloride-vinyl acetate copolymer (Vinylite VAGH) | 21.80 |
| Hexamethylol ether of hexamethylol melamine (Cymel 301) | 2.71 |
| Tung oil | 0.54 |
| n-Butyl alcohol | 14.38 |
| Methyl-isobutyl ketone | 32.72 |
| Toluene | 27.836 |
| Phosphoric acid 85% (food grade) | 0.014 |

(B) Coating solution

| | Percent |
|---|---|
| Vinyl chloride-vinyl acetate copolymer (Vinylite VYDS) | 23.85 |
| Toluene | 42.00 |
| Methyl ethyl ketone | 14.11 |
| Xylene | 11.48 |
| 4-methyl-4-methyl-pentanone-2 | 1.09 |
| Dimethyl formamide | 1.09 |
| Acetone | 1.42 |
| Propylene oxide | 0.36 |
| Adhesive concentrate solution IVA | 4.60 |

EXAMPLE V (A) Adhesive concentrate solution

| | Percent |
|---|---|
| Vinyl chloride-vinyl acetate-maleic acid interpolymer (Vinylite VMCH) | 16.25 |
| Hexamethylol ether of hexamethylol melamine (Cymel 301) | 6.25 |
| Tung oil | 2.50 |
| n-Butyl alcohol | 14.38 |
| Methyl-isobutyl ketone | 32.77 |
| Toluene | 27.836 |
| Phosphoric acid 85% (food grade) | 0.014 |

(B) Coating solution

| | Percent |
|---|---|
| Vinyl chloride-vinyl acetate copolymer (Geon 440X30) | 20.00 |
| Toluene | 30.45 |
| Methyl ethyl ketone | 14.11 |
| Xylene | 11.48 |
| 4-methyl-4-methyl-pentanone-2 | 1.09 |
| Dimethyl formamide | 1.09 |
| Acetone | 1.42 |
| Propylene oxide | 0.36 |
| Adhesive concentrate solution VA | 20.00 |

EXAMPLE VI (A) Adhesive concentrate solution

| | Percent |
|---|---|
| Hydrolyzed vinyl chloride-vinyl acetate copolymer (Vinylite VAGH) | 16.25 |
| Hexamethylol ether of hexamethylol melamine (Cymel 301) | 6.25 |
| Linseed Oil (raw) | 2.50 |
| n-Butyl alcohol | 14.38 |
| Methyl-isobutyl ketone | 32.77 |
| Toluene | 27.836 |
| Phosphoric acid 85% (food grade) | 0.014 |

(B) Coating solution

| | Percent |
|---|---|
| Vinyl chloride-vinyl acetate copolymer (Geon 440X30) | 20.00 |
| Toluene | 30.45 |
| Methyl ethyl ketone | 14.11 |
| Xylene | 11.48 |
| 4-methyl-4-methyl-pentanone-2 | 1.09 |
| Dimethyl formamide | 1.09 |
| Acetone | 1.42 |
| Propylene oxide | 0.36 |
| Adhesive concentrate solution VIA | 20.00 |

EXAMPLE VII (A) Adhesive concentrate solution

| | Percent |
|---|---|
| Hydrolyzed vinyl chloride-vinyl acetate copolymer (Vinylite VAGH) | 16.25 |
| Hexamethylol ether of hexamethylol melamine (Cymel 301) | 6.25 |
| Soyabean oil | 2.50 |
| n-Butyl alcohol | 14.38 |
| Methyl isobutyl ketone | 32.77 |
| Toluene | 27.836 |
| Phosphoric acid 85% (food grade) | 0.014 |

(B) Coating solution

| | Percent |
|---|---|
| Vinyl chloride-vinyl acetate copolymer (Geon 440X30) | 20.00 |
| Toluene | 30.45 |
| Methyl ethyl ketone | 14.11 |
| Xylene | 11.48 |
| 4-methyl-4-methyl-pentanone-2 | 1.09 |
| Dimethyl formamide | 1.09 |
| Acetone | 1.42 |
| Propylene oxide | 0.36 |
| Adhesive concentrate solution VIIA | 20.00 |

EXAMPLE VIII (A) Adhesive concentrate solution

| | Percent |
|---|---|
| Hydrolyzed vinyl chloride-vinyl acetate copolymer (vinylite VAGH) | 16.25 |
| Butylated urea formaldehyde (Uformite 240N) | 6.25 |
| Tung oil | 2.50 |
| n-Butyl alcohol | 14.38 |
| Methyl isobutyl ketone | 32.77 |
| Toluene | 27.836 |
| Phosphoric acid 85% (food grade) | 0.014 |

(B) Coating solution

| | Percent |
|---|---|
| Vinyl chloride-vinyl acetate coplymer (Geon 440X30) | 20.00 |
| Toluene | 30.45 |
| Methyl ethyl ketone | 14.11 |
| Xylene | 11.48 |
| 4-methyl-4-methyl-pentanone-2 | 1.09 |
| Dimethyl formamide | 1.09 |
| Acetone | 1.42 |
| Propylene oxide | 0.36 |
| Adhesive concentrate solution VIIIA | 20.00 |

EXAMPLE IX (A) Adhesive concentrate solution

| | Percent |
|---|---|
| Hydrolyzed vinyl chloride-vinyl acetate copolymer (Vinylite VAGH) | 16.25 |
| Butylated melamine formaldehyde (Cymel 248-8) | 6.25 |
| Tung oil | 2.50 |
| n-Butyl alcohol | 14.38 |
| Methyl isobutyl ketone | 32.77 |
| Toluene | 27.836 |
| Phosphoric acid 85% (food grade) | 0.014 |

(B) Coating solution

| | Percent |
|---|---|
| Vinyl chloride-vinyl acetate copolymer (Geon 440X30) | 20.00 |
| Toluene | 30.45 |
| Methyl ethyl ketone | 14.11 |
| Xylene | 11.48 |
| 4-methyl-4-methyl-pentanone-2 | 1.09 |
| Dimethyl formamide | 1.09 |
| Acetone | 1.42 |
| Propylene oxide | 0.36 |
| Adhesive concentrate solution IXA | 20.00 |

EXAMPLE X (A) Adhesive concentrate solution

| | Percent |
|---|---|
| Hydrolized vinyl chloride-vinyl acetate coplymer (Vinylite VAGH) | 16.25 |
| Isobuylated melamine formaldehyde (Cymel 225-10) | 6.25 |
| Tung oil | 2.50 |
| n-Butyl alcohol | 14.38 |
| Methyl isobutyl ketone | 32.77 |
| Toluene | 27.836 |
| Phosphoric acid 85% (food grade) | 0.014 |

(B) Coating solution

| | Percent |
|---|---|
| Vinyl chloride-vinyl acetate copolymer (Geon 440X30) | 20.00 |
| Toluene | 30.45 |
| Methyl ethyl ketone | 14.11 |
| Xylene | 11.48 |
| 4-methyl-4-methyl-pentanone-2 | 1.09 |
| Dimethyl formamide | 1.09 |
| Acetone | 1.42 |
| Propylene oxide | 0.36 |
| Adhesive concentrate solution XA | 20.00 |

EXAMPLE XI (A) Adhesive concentrate solution

| | Percent |
|---|---|
| Hydrolyzed vinyl chloride-vinyl acetate copolymer (Vinylite VAGH) | 16.25 |
| Triazine formaldehyde (Uformite MX-61) | 6.25 |
| Tung oil | 2.50 |
| n-Butyl alcohol | 14.38 |
| Methyl isobutyl ketone | 32.77 |
| Toluene | 27.836 |
| Phosphoric acid 85% (food grade) | 0.014 |

(B) Coating solution

| | Percent |
|---|---|
| Vinyl chloride-vinyl acetate copolymer (Geon 440X30) | 20.00 |
| Toluene | 30.45 |
| Methyl ethyl ketone | 14.11 |
| Xylene | 11.48 |
| 4-methyl-4-methyl-pentanone-2 | 1.09 |
| Dimethyl formamide | 1.09 |
| Acetone | 1.42 |
| Propylene oxide | 0.36 |
| Adhesive concentrate solution XIA | 20.00 |

It has been found that each of the coating solutions specified in the above examples, when applied by roller coating, spraying, knifing or any other conventional means, over any of the commonly employed base coats to provide a dry film weight of 4 to 5 mg. per square inch after baking for 6 to 8 minutes at approximately 320° F., produces a top coat having stronger adherence to such base coats than has been previously achievable and which is also exceptionally resistant to water and alcohol. The times and temperatures at which baking is effected may be varied, for example, between baking at 275° F. for about 10 minutes and baking at 375° F. for about 3 minutes.

The foregoing assertion regarding the adhesion of top coats formed of coating solutions in accordance with this invention is based on comparative tests using the following base coats which are representative of commercially approved formulations:

(1) Commercial oleorensinous base coat

This base coat is applied from a solution of an 11 gallon oil length resin/bodied linseed-bodied tung/unbodied tung oil varnish in sufficient hydrocarbon solvents to provide 52% non-volatile matter in the solution. The solution further contains 60 p.p.m. manganese naphthenate drier and 120 p.p.m. iron octoate drier, and has a viscosity of 50 to 60 seconds in a No. 4 Ford cup at 80° F. The solution is applied to the metal substrate by a commercial roller coating press to provide a base coat having a dry film weight of 2.5 to 3.0 mg. per square inch when baked for 10 minutes at 410° F.

(2) Commercial polybutadiene base coat

This base coat is applied by roller coating the metal substration with a solution of the product available commercially under the tradename Budium RK-662, and which has been reduced with mineral spirits to a viscosity of 25 to 40 seconds in a No. 4 Ford Cup at 80° F. Such product is essentially based on a polybutadiene polymer, such as, in Example 1 of U.S. Patent No. 2,876,207. The coating solution is applied to provide a base coat having a dry film weight of 2.5 to 3.0 mg. per square inch when baked for 10 minutes at 385° F.

(3) Commercial epoxy resin/urea/formaldehyde resin blend base coat

The solution for the roller coating application of this base coat has the formulation:

| | |
|---|---|
| Epichlorhydrin/bisphenol epoxy resin (epoxy equivalent 1600–1900, hydroxyl equivalent 190, melting point 117–135° C.) lbs | 10 |
| Butylated urea/formaldehyde resin solution (50 parts solid in 22 parts n-butyl alcohol and 28 parts xylene) gals | 1¼6 |
| Ethyleneglycol monoethyl ether acetate gals | 1⅞6 |
| Diacetone alcohol gals | 1⅞6 |

The above solution is applied to provide a base coat having a dry film weight of 2.5 to 3.0 mg. per square inch when baked for 10 minutes at 410° F.

In the adhesion tests tabulated below, all of the top coats were applied by roller coating over the respective base coated metal sheets to provide each top coat with a dry film weight of 4 to 5 mg. per square inch after baking for 10 minutes at 320° F. Each adhesion test consisted in pressing unused strips of "Scotch" tape, of at least ¾ inch width, against the wax free surface of the top coat previously cooled to room temperature. The strips of "Scotch" tape are applied over "X" scratches previously made in the top coat at the center and each corner portion of the coated sheet, and sufficient pressure is applied to ensure a good bond of the tape with the top coat and to eliminate any bubbles therebetween. Then an end of each tape is jerked sharply away from the coated sheet in a direction normal to the latter so as to strip the tape from the coated sheet. Each removed strip of tape and the area of the top coat previously covered thereby are then inspected for evidence of the removal of top coat material from the coated sheet. In the following table, the removal of top coat material from the base coated sheet, and hence the degree of intercoat adhesion between the base and top coats, are evaluated on a scale of "0" to "10", with "0" representing complete removal of the top coat and hence complete loss of intercoat adhesion, and "10" representing no removal of top coat material and hence excellent intercoat adhesion.

The comparative adhesion tests have been conducted with respect to coating solutions according to several specific examples of this invention, as identified in the following table, and also with respect to various other vinyl resin coating solutions from which there has been omitted one or more of the essential constituents (aminoplast, reactive vinyl resin and oil) of the adhesive concentrate according to this invention. Such other vinyl resin coating solutions have the following formulations:

Coating solution K

Percent (by weight)

| | |
|---|---|
| Vinyl chloride-vinyl acetate copolymer (Geon 440X30) | 25.00 |
| Toluene | 45.45 |
| Methyl ethyl ketone | 14.11 |
| Xylene | 11.48 |
| 4-methyl-4-methyl-pentanone-2 | 1.09 |
| Dimethyl formamide | 1.09 |
| Acetone | 1.42 |
| Propylene oxide | 0.36 |

Coating solution L

Percent (by weight)

| | |
|---|---|
| Vinyl chloride-vinyl acetate copolymer (Geon 440X30) | 20.00 |
| Vinyl chloride-vinyl acetate-maleic acid interpolymer (Vinylite VMCH) | 4.25 |
| n-Butyl alcohol | 2.88 |
| Methyl isobutyl ketone | 6.54 |
| Phosphoric acid 85% (food grade) | trace |
| Toluene | 36.78 |
| Methyl ethyl ketone | 14.11 |
| Xylene | 11.48 |
| 4-methyl-4-methyl-pentanone-2 | 1.09 |
| Dimethyl formamide | 1.09 |
| Acetone | 1.42 |
| Propylene oxide | 0.36 |

Coating solution M

Percent (by weight)

| | |
|---|---|
| Vinyl chloride-vinyl acetate copolymer (Geon 440X30) | 20.00 |
| Vinyl chloride-vinyl acetate-maleic acid interpolymer (Vinylite VMCH) | 2.125 |
| Hydrolyzed vinyl chloride-vinyl acetate copolymer (Vinylite VAGH) | 2.125 |
| n-Butyl alcohol | 2.88 |
| Methyl isobutyl ketone | 6.54 |
| Phosphoric acid 85% (food grade) | trace |
| Toluene | 36.78 |
| Methyl ethyl ketone | 14.11 |
| Xylene | 11.48 |
| 4-methyl-4-methyl-pentanone-2 | 1.09 |
| Dimethyl formamide | 1.09 |
| Acetone | 1.42 |
| Propylene oxide | 0.36 |

Coating solution N

Percent (by weight)

| | |
|---|---|
| Vinyl chloride-vinyl acetate copolymer (Geon 440X30) | 20.00 |
| Hexamethylol ether of hexamethylol melamine (Cymel 301) | 4.25 |
| n-Butyl alcohol | 2.88 |
| Methyl isobutyl ketone | 6.54 |
| Phosphoric acid 85% (food grade) | trace |
| Toluene | 36.78 |
| Methyl ethyl ketone | 14.11 |
| Xylene | 11.48 |
| 4-methyl-4-methyl-pentanone-2 | 1.09 |
| Dimethyl formamide | 1.09 |
| Acetone | 1.42 |
| Propylene oxide | 0.36 |

TABLE—BASE COATED SUBSTRATES

| Coating solution for top coats | Commercial oleoresinous base coated tin plate | Commercial polybutadiene base coated tin plate | Commercial epoxy/urea/ formaldehyde base coated tin free steel |
|---|---|---|---|
| K | 0 | 0 | 0 |
| L | 5 | 3 | 0 |
| M | 7 | 7+ | 0 |
| N | 2 | 4 | 0 |
| Example I | 9 | 9+ | 9+ |
| Example II | 9 | 9 | 9+ |
| Example IV | 9 | 9 | 9 |
| Example VIII | 9 | 9 | 9+ |

From the above it will be apparent that all of the top coats formed of solutions containing adhesive concentrates according to this invention have uniformly high adhesiveness with respect to all of the representative base coats, whereas the top coats formed of coating solutions from which one or more of the essential constituents of the adhesive concentrate have been omitted all have relatively lower degrees of adhesion to the base coated substrates and exhibit more adhesion to certain base coats than to others. Further, the top coats according to this invention fully satisfy all other specifications of can manufacturers for containers of beer and other carbonated or non-carbonated beverages, particularly with respect to coverage of the base coated substrates, influencing of the flavor of the contained beverage, resistance to sterilization and pasteurization, and resistance to fracture. It will also be noted that the advantageous properties of the top coats in accordance with this invention are achieved even when the reactive constituents (aminoplast, reactive vinyl resin and oil) constitute as little as 4.6%, by weight, of the non-volatile components in the coating solution, that is, when the top coat consists of as much as 95.4%, by weight, of unmodified vinyl chloride-vinyl acetate copolymer, from which it follows that such advantageous properties are achieved without any substantial increase in cost.

Although illustrative embodiments of the invention have been described in detail herein, it is apparent that the invention is not limited to those precise embodiments, and that various changes and modifications may be effected therein by one skilled in the art without departing from the scope or spirit of the invention as defined in the appended claims.

What is claimed is:

1. A coating composition for lining base coated metal containers and parts thereof, comprising a non-volatile content of which approximately 4.5 to 20 wt. percent essentially consists of a mixture of a vinyl resin containing a reactive hydrogen group selected from the class consisting of hydrolyzed vinyl chloride-vinyl acetate copolymer, vinyl chloride-vinyl acetate-maleic acid interpolymer and mixtures thereof, an aminoplast and an uncombined oil, said vinyl resin containing a reactive hydrogen group, said aminoplast and said uncombined oil being respectively present in said mixture in amounts constituting from 65 to 87.5%, from 11 to 25% and from 2 to 10% of the total weight of said mixture, the balance of said non-volatile content being constituted by a non-reactive vinyl chloride-vinyl acetate copolymer, and a volatile liquid organic solvent system for said non-volatile content, said non-volatile content being from 15 to 27 wt. percent of the composition.

2. A coating composition according to claim 1, in which said non-reactive vinyl chloride-vinyl acetate polymer contains from 85% to 87% by weight vinyl chloride and from 13% to 15% by weight vinyl acetate.

3. A coating composition according to claim 1, in which said hydrolyzed vinyl chloride-vinyl acetate copolymer contains, by weight, approximately 91% vinyl chloride, 3% vinyl acetate and 6% vinyl alcohol, and said interpolymer contains, by weight, approximately 86% vinyl chloride, 13% vinyl acetate and 1% maleic acid.

4. A coating composition according to claim 1, in which said aminoplast is selected from the class consisting of butylated urea-and melamine-formaldehydes, triazine formaldehydes, polymethyl ethers of polymethylol melamine, and mixtures thereof.

5. A coating composition according to claim 4, in which said aminoplast is the hexamethylol ether of hexamethylol melamine.

6. A coating composition according to claim 4, in which said oil is selected from the class consisting of tung oil, linseed oil, soybean oil, safflower oil, castor oil and olive oil.

7. A coating composition according to claim 1, in which said oil is selected from the class consisting of tung oil, linseed oil, soybean oil, safflower oil, castor oil and olive oil.

8. A coating composition according to claim 1, in which said mixture further contains an acid catalyst to increase the reactivity of said aminoplast, said catalyst being present in an amount constituting from 0.2% to 0.5% by weight of the weight of said aminoplast in said mixture.

9. A coating composition according to claim 8, in which said acid catalyst is selected from the class consisting of phosphoric acid, para-toluene sulfonic acid and citric acid.

10. A coating composition according to claim 1, in which said solvent system contains at least one oxygen containing polar solvent.

11. A coating composition according to claim 1, in which said solvent system contains at least one oxygen containing polar solvent, an aromatic hydrocarbon liquid having a boiling point in the range between 228° F. and 450° F. and an alcohol to stabilize the viscosity of said composition and to prevent premature reaction of said aminoplast with said vinyl resin containing a reactive hydrogen group.

12. A coating composition according to claim 1, in which said solvent system contains from 15% to 98% by weight of an oxygen containing polar solvent selected from the class consisting of methyl ethyl ketone and methyl isobutyl ketone, from 1% to 50% by weight of an aromatic hydrocarbon liquid selected from the class consisting of toluene and xylene, and from 1% to 35% by weight of n-butyl alcohol.

13. A coated container component having a metal substrate with a base coat thereon and a top coat covering said base coat in strongly adherent relation thereto to form an exposed internal lining adapted to contact a contained beverage when in use, said exposed lining being composed essentially of the resinous film-forming materials secured by applying to said base coat a wet film of the composition claimed in claim 1 and baking the same for 3 to 10 minutes at temperatures in the range between 275° F. and 375° F.

14. A coated container component having a metal substrate with a base coat thereon and a top coat covering said base coat in strongly adherent relation thereto to form an exposed internal lining adapted to contact a contained beverage when in use, said exposed lining being composed essentially of the resinous film-forming materials secured by applying to said base coat a wet film of the composition claimed in claim 6 and baking the same for 3 to 10 minutes at temperatures in the range between 275° F. and 375° F.

15. A coated container component according to claim 14, in which said base coat is constituted by a film forming resin selected from the group consisting of phenolics, polybutadienes, ole-resinous lacquers, acrylics, and epoxies.

16. A coated container component according to claim 15, in which said top coat has a film weight of 4 to 5 mg. per square inch.

References Cited

UNITED STATES PATENTS

| | | | |
|---|---|---|---|
| 2,860,801 | 11/1958 | Nielsen | 220—64 |
| 3,030,229 | 4/1962 | Esswein et al. | 220—64 |
| 3,137,666 | 6/1964 | Lox et al. | 260—21 |
| 3,268,620 | 8/1966 | Tarwid | 220—64 |
| 3,370,975 | 2/1968 | Semroc | 117—75 |
| 3,378,509 | 4/1968 | Jerabek | 260—21 |

HOSEA E. TAYLOR, JR., Primary Examiner

R. W. GRIFFIN, Assistant Examiner

U.S. Cl. X.R.

117—75, 132, 161, 167; 220—64; 260—22, 23, 31.4, 32.4, 32.8, 33.4, 33.6, 33.8, 45.7, 45.95, 852, 887